Figure 1:
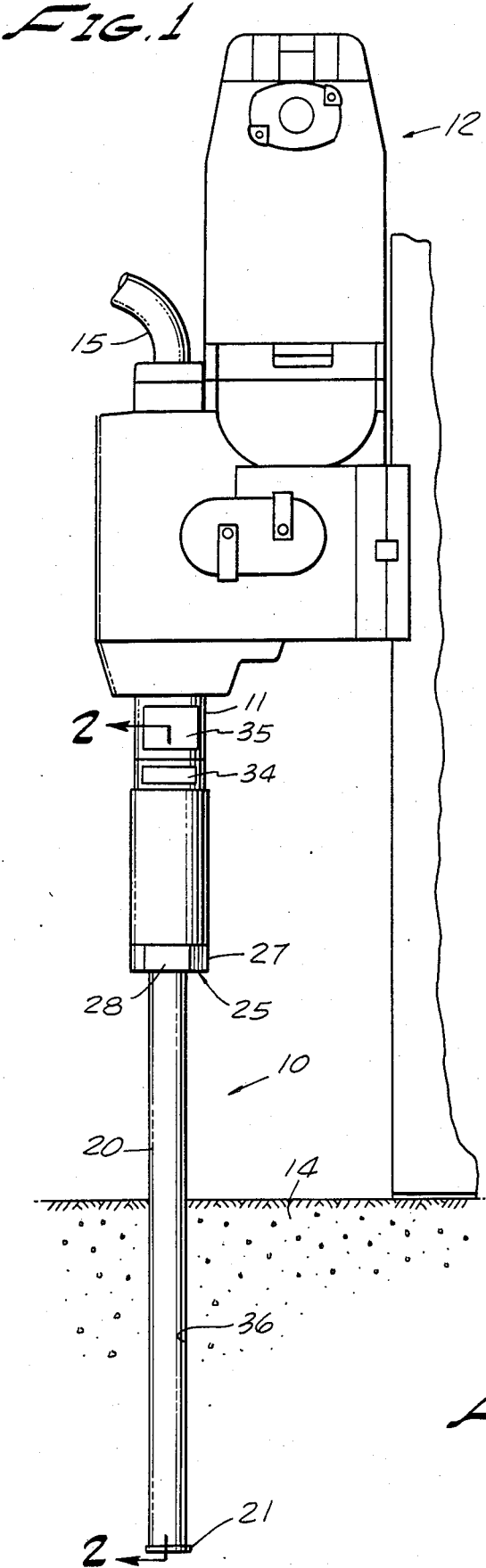

United States Patent [19]

Bossler

[11] Patent Number: 4,657,445
[45] Date of Patent: Apr. 14, 1987

[54] CORE DRILL AND METHOD OF REMOVING A CORE THEREFROM

[76] Inventor: Joseph Bossler, 1412 E. Arrow Hwy., Irwindale, Calif. 91760

[21] Appl. No.: 588,230

[22] Filed: Mar. 12, 1984

[51] Int. Cl.⁴ ............................................. B23B 35/00
[52] U.S. Cl. ..................................... 408/1 R; 175/58; 175/330; 175/404; 279/20; 408/68; 408/207; 408/239 R
[58] Field of Search ................. 408/59, 204, 205, 206, 408/207, 703, 67, 68; 175/244, 248, 249, 256, 316, 320, 330, 403, 332, 333, 58, 60, 84, 236, 239, 240, 245, 251, 252, 387, 404; 279/101, 103, 20

[56] References Cited

U.S. PATENT DOCUMENTS

| | | | |
|---|---|---|---|
| 766,588 | 8/1904 | Brejcha | 175/60 X |
| 1,657,368 | 7/1928 | Carter | 175/240 |
| 2,188,631 | 1/1940 | Kraus | 408/59 |
| 2,197,019 | 4/1940 | Monroe | 175/256 X |
| 2,204,844 | 6/1940 | Chappell | 175/387 X |
| 2,343,793 | 3/1944 | Paget | 175/249 |
| 2,587,231 | 2/1952 | Schierding | 175/387 X |
| 2,709,072 | 5/1955 | Hitchcock | 175/403 X |
| 2,862,691 | 12/1958 | Cochran | 175/387 X |
| 3,054,308 | 9/1962 | Larry | 408/59 |
| 3,139,945 | 7/1964 | De Ré et al. | 175/251 X |
| 3,215,210 | 11/1965 | Dickinson | 175/244 X |
| 3,291,229 | 12/1966 | Houston | 175/60 |
| 3,331,455 | 7/1967 | Anderson, Jr. et al. | 175/403 |
| 3,473,617 | 10/1969 | Elenburg | 175/60 X |
| 3,696,873 | 10/1972 | Andersson | 175/404 X |
| 3,736,995 | 6/1973 | Salter | 175/330 |
| 3,774,556 | 11/1973 | Poll | 175/320 X |
| 3,778,179 | 12/1973 | Rivas | 408/206 |
| 3,870,431 | 3/1975 | Luckenbill et al. | 408/204 X |
| 3,981,371 | 9/1976 | Wallis | 175/60 X |

Primary Examiner—Gil Weidenfeld
Assistant Examiner—Glenn L. Webb
Attorney, Agent, or Firm—Sellers & Brace

[57] ABSTRACT

Disclosed is an improved core drill and a method of detachably coupling the same to a power driving unit to expedite the removal of a core therefrom. This is achieved by equipping the rear end of the drill stem with a fixedly attached externally threaded bushing. A coupling sleeve has internal threads at either end matable respectively with the bushing threads and the threaded drive shank of a power driving unit. This sleeve and the core drill are readily detached as a unit from the power drive thereby permitting the rapid removal of the core from the rear end of the drill rather than past the cutting ring at its front end.

4 Claims, 2 Drawing Figures

CORE DRILL AND METHOD OF REMOVING A CORE THEREFROM

This invention relates to core drills, and more particularly to a novel coupling and method for detachably connecting the same to the drive shank of a conventional driving unit.

BACKGROUND OF THE INVENTION

Conventional core bits in widespread use typically have a ring of cutting teeth at their forward end which extend inwardly beyond the bit wall and outwardly beyond its exterior thereby to cut an annular ring having a desirable degree of clearance with the main body of the bit. Such bits present a problem, particularly in smaller diameter sizes thereof, as respects the removal of the core at the end of a drilling operation. This is because of the tendency of the core to hang up on the inwardly projecting teeth and inner shoulder of the cutting ring. This renders removal of the core time consuming and frustrating. Not infrequently, outwardly protruding portions of the core break off and this necessitates restarting the removal operation with a lighter weight residue core. A common experience is that the removal operation consumes more time and energy than that associated with drilling the hole.

The only prior teaching known to me for assisting the removal of a core from a tubular drill is that contained in U.S. Pat. No. 2,188,631 to Kraus wherein the drill stem is equipped with an internal compression spring which applies pressure to the core as drilling proceeds. This spring would not overcome the problem of hang up of the core in a drill bit equipped with a cutting ring having teeth projecting inwardly of the ID of the drill stem. Moreover the presence of the compression spring seriously limits the depth of the hole which can be cut with such a bit. No other prior teaching known to me provides a satisfactory solution to the problem.

SUMMARY OF THE INVENTION

The foregoing and other shortcomings and disadvantages of prior core drills is avoided by the simple expedients characterizing the present invention. To this end the rear end of the drill bit is provided with improved coupling means holding the same detachably assembled to the power unit employed to drive the bit. Typically, this coupling comprises an externally threaded bushing brazed or otherwise secured to the inlet end of the bit and an adapter sleeve equipped with internal threads at its opposite ends, one set being matable with the bushing threads and the other with the driving shank of the power tool. Both the bushing and the coupling sleeve are preferably provided with flats or other wrench engaging surfaces to facilitate separation of the bushing and drill from the sleeve and the sleeve from the power unit. At the end of the drilling operation, the bit with its detachable coupling is readily separated from the power unit thereby permitting the core to be withdrawn from the rear end of the bit. This operation is completed expeditiously and in the short time required to unwrench the bit, eject the core and reassemble the bit and its coupling to the power unit.

Accordingly, it is a primary object of this invention to provide an improved core drill and method enabling a core to be quickly removed at the end of a drilling operation.

Another object of the invention is the provision of an improved core drill having a coupling assembly at its inlet end constructed and arranged for detachably holding the drill to a power tool and enabling the drill to be detached quickly for the removal of a core.

These and other more specific objects will appear upon reading the following specification and claims and upon considering in connection therewith the attached drawing to which they relate.

Figure 2:
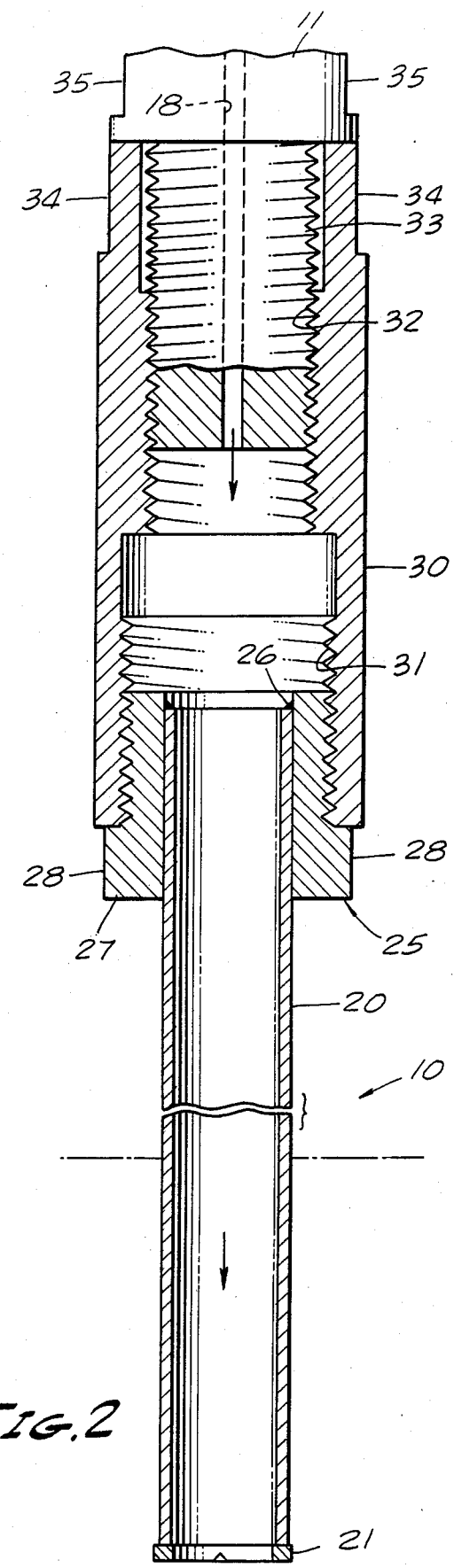

Referring now to the drawing in which a preferred embodiment of the invention is illustrated:

FIG. 1 is an elevational view showing an illustrative embodiment of the invention core drill attached to a power unit and in use to drill a deep hole in masonary, concrete or the like; and FIG. 2 is a cross sectional view on an enlarged scale taken along line 2—2 of FIG. 1.

Referring initially to FIG. 1, a core bit designated generally 10 embodying the present invention is shown coupled to the rotary shank 11 of a typical power tool 12 well known to persons skilled in this art. Power unit 12 is shown slidably supported lengthwise of the rail 13 of a support resting against rock, concrete or other solid material 14 undergoing drilling. Power unit 12 includes a cutting fluid supply hose 15 extending to a source of water or other cutting fluid supplied to the drill bit through a flow passage 18 extending axially of the power driven shank 11.

Referring more particularly to FIG. 2 drill bit 10 has a tubular main body 20 having a cutting ring of teeth 21 welded, brazed or otherwise secured to its forward end. This cutting ring projects slightly inwardly and slightly outwardly of the respective ID and OD surfaces of the drill body 20 and has a multiplicity of cutting teeth fused or otherwise securely fixed to all of its exterior surfaces in accordance with practice well known to persons skilled in this art. The radial protrusion of the side walls of the cutting ring inwardly and outwardly of the drill's main body provides for the free flow of cutting fluid along both the inner and outer surfaces of the main body in order that the chips may be carried away. This also avoids unnecessary friction and binding of the drill with either the core or with the side wall of the bore.

The improved means for coupling the invention drill to the power unit includes an externally threaded bushing 25 encircling the rear end of the main body and fixed thereto as by welding or brazing 26. The forward end of the bushing is provided with a circular flange 27, at least one and preferably both of the opposed sides are provided with wrench engaging flats 28. Secured to the bushing threads is a sleeve 30 having threads 31 and 32 at its opposite ends. The lower set of threads 31 are engageable with the bushing threads and threads 32 are engageable with the threads 33 at the lower end of the power tool shank 11. The upper end of sleeve 34 is preferably provided with wrench engaging flats 34 and the power unit shank flats 35.

In operation, the rear end of a core drill main body is equipped with a bushing 27 and the coupling sleeve 30 is securely assembled thereto using wrenches applied to flats 28 of the bushing and 34 of sleeve 30. This drill unit is then assembled to the threaded shank 33 and wrenched tight by the application of wrenches to flats 34 and 35.

After the assembled tool has been used to drill a hole 36 in concrete or the like 14, the tool is withdrawn and wrenches are used to detach the entire drill including sleeve 30 from the tool shank 11. The core is then quickly removed by upending the drill allowing the core to fall freely from the sleeve-equipped rear end of the drill main body 20. Drilling of the next hole is quickly resumed by the simple expedient of reassembling coupling 30 to the tool shank.

While the particular improved core drill and method of removing a core therefrom herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That method of expediting the removal of a core from the interior of a tubular core drill which comprises:
   fixedly securing an externally threaded bushing to the rear end of said core drill;
   providing a sleeve for detachably coupling said bushing-equipped core drill to the externally threaded drive shank of a power unit for said core drill which coupling sleeve is threaded internally of the opposite ends thereof and respectively sized to mate one with said threaded bushing and one with said threaded drive shank;
   providing said sleeve with wrench engaging means for the assembly and disassembly thereof to and from said drive shank; and
   detaching said sleeve from said drive shank and withdrawing by gravity a core through the rear end of said drill stem and coupling sleeve.

2. That improvement in a core drill of the type having a tubular drill stem equipped at its forward end with a cutting ring of greater OD and smaller ID than said drill stem, said improvement comprising:
   a coupling assembly for detachably securing the rear end of said drill stem to the externally threaded shank of a rotary power unit;
   said coupling assembly including an externally threaded bushing fixedly secured to the exterior of the rear end of said drill stem and a sleeve having first and second sets of internal threads at the respective ends thereof, and an internal diameter at least as great as the internal diameter of said drill stem, said first set of threads being matable with the threads of said threaded bushing and said second set of threads being adapted for threaded assembly to said externally threaded shank of a rotary power unit whereby said sleeve and a drill stem assembled thereto may be readily detached as a unit from said threaded shank of a power unit to expedite the removal of a core from the rear end of said drill stem and said sleeve.

3. That improvement defined in claim 2 characterized in that said sleeve is provided with wrench engaging means on the exterior thereof to facilitate the assembly and disassembly thereof to said externally threaded shank of said power unit.

4. That improvement defined in claim 2 characterized in that said drill stem is an imperforate tube of uniform diameter and free of internal obstructions from end to end thereof; and said threaded bushing being provided on its exterior with wrench engaging means useful in disassembling said bushing and said drill stem as a unit from said sleeve.

* * * * *